Inventor
Charles A. Chayne
By Willits, Helwig & Baillio
Attorneys

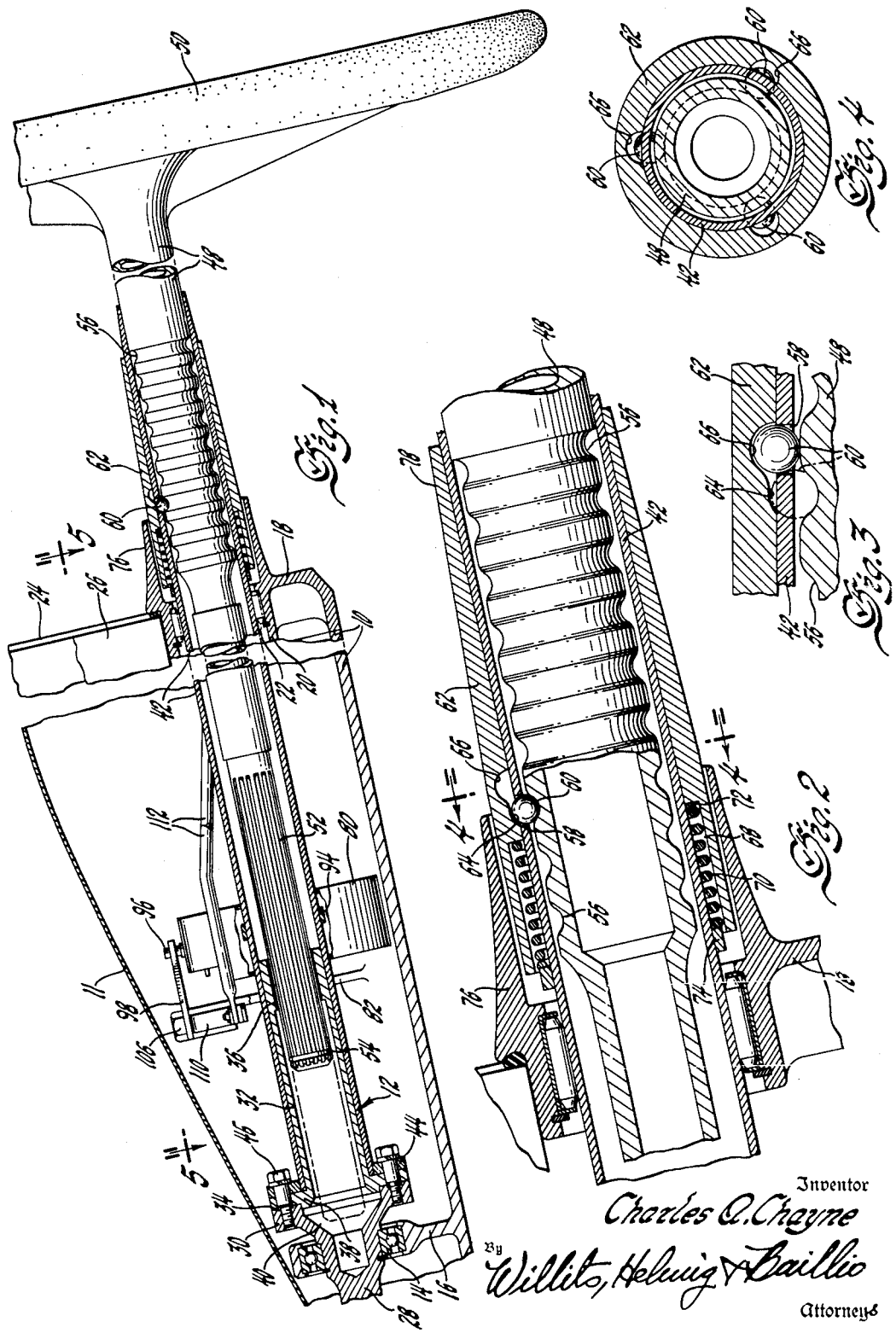

United States Patent Office 2,744,419
Patented May 8, 1956

2,744,419

STEERING COLUMN ASSEMBLY

Charles A. Chayne, Flint, Mich., assignor to General Motors Corporation, Detroit, Mich., a corporation of Delaware Application February 9, 1951, Serial No. 210,254

15 Claims. (Cl. 74—493)

This invention relates to a steering column construction and more particularly to an improved axially adjustable steering shaft and a switching control assembly mounted on the steering column.

The modern automobile designed for high speed travel on our new super highways must be designed with a low body profile and a low center of gravity in order to have fine roadability and riding qualities. In vehicles having an exceptionally low profile the steering column is generally substantially horizontal or at a very slight inclination to the horizontal. Thus the steering column and the steering shaft enters the driving compartment through the dash or instrument panel in a substantially horizontal plane.

When the steering shaft enters the driver's compartment substantially horizontally it is desirable to obtain maximum driving comfort to not only adjust the seat with relation to the vehicle controls but also to adjust the steering wheel with relation to the seat and the other driving controls.

Though several attempts have been made to provide an axially adjustable steering shaft they have not produced a satisfactory solution to the problem. In the main they require that the car be taken to a garage so that a mechanic may make the adjustment. Some that are capable of adjustment by the driver of the vehicle are not satisfactory with regard to ease of adjustment and locking security. The present design provides a locking device which secures the steering wheel in each of several axial positions with respect to the steering shaft. The position of the steering wheel may readily be adjusted by grasping a sleeve and allowing several balls to move out of the locking position. The steering shaft extends from the steering gear and terminates in a tubular section having internal splines. A steering wheel on a short shaft section fits within the tubular section on the steering shaft and is rotatably connected thereto by suitable splines which permit axial sliding movement. The steering wheel shaft section has a plurality of annular recesses to provide several adjusted positions of the steering wheel. The steering shaft tube has a plurality of holes disposed around the circumference of the tube in a ring. Locking balls fit in these holes and may be forced inwardly to lock the shafts by engaging both the holes in the steering shaft tube and the grooves in the steering shaft section by a sliding sleeve which fits around the outside of the steering shaft tube. The locking sleeve is maintained in the locking position by a spring and may be moved manually in the other direction to unlock and adjust the axial length of the steering shaft.

Where the steering shaft moves axially with respect to the steering column it was felt desirable to mount the direction signal switch on a fixed portion of the steering column and shaft. Thus the direction signal switch surrounding the steering shaft tube is controlled by a lever system operated by a pair of push buttons on the dash panel.

The primary object of the invention is to provide an improved axially adjusted steering shaft that will enable the driver to position the steering wheel at the proper position in relation to the brake pedal and accelerator pedal and the seat for his own personal needs.

Another object of the invention is to provide an improved axially adjusted steering shaft in which the driver may while seated in the vehicle in driving position readily adjust the axial length of the steering shaft to the proper position with regard to his personal requirements with respect to the other driving controls.

Another object of the invention is to provide an improved axially adjusted steering shaft in which a plurality of locking balls are seated in a tubular portion of the shaft and urged into one of several grooves in a hand wheel shaft section by an exterior adjusting sleeve.

Another object of the invention is to provide in a steering column having an axially adjustable steering wheel, a direction signal switch mounted surrounding the steering shaft and operated by buttons mounted on a panel supported by the steering column.

Further objects and advantages of the present invention will be more apparent from the following description and the accompanying drawings wherein a preferred embodiment of the present invention is clearly shown.

Figure 1 is an elevation of an adjustable steering column and the steering and switch control mechanism with parts in section to show details of the invention.

Figure 2 is an enlargement of the locking portion of the adjustable steering mechanism shown in Figure 1.

Figure 3 is an enlargement of Figure 2 showing the locking ball detail in the unlocked position.

Figure 4 is a section of Figure 2 on the line 4—4.

Figure 5:
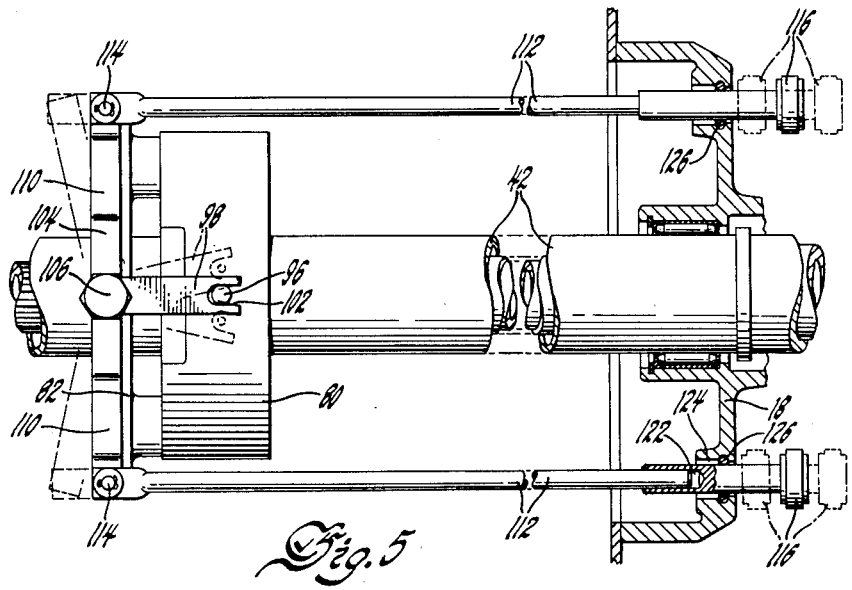
Figure 5 is an elevation view of the steering column mechanism showing the switch control mechanism with parts in section to show details.
Figure 6:
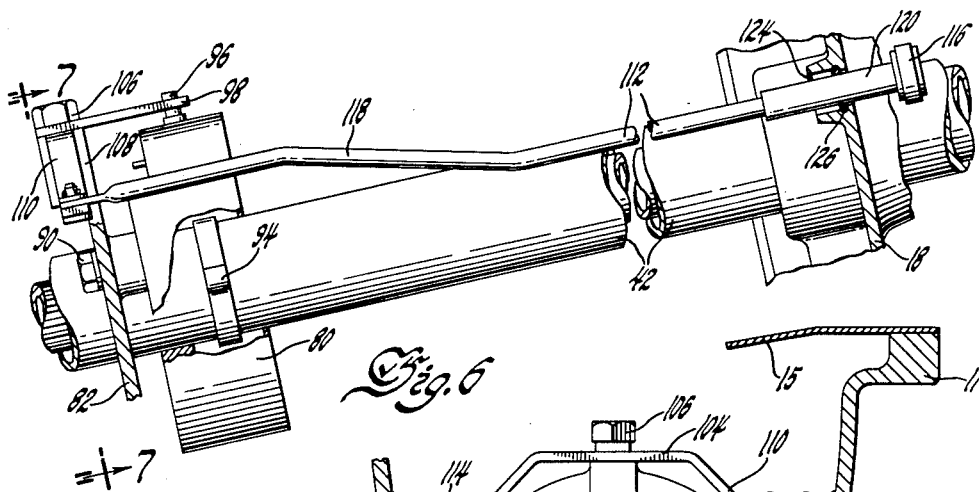
Figure 6 is a side elevation of the switch control mechanism.
Figure 7:
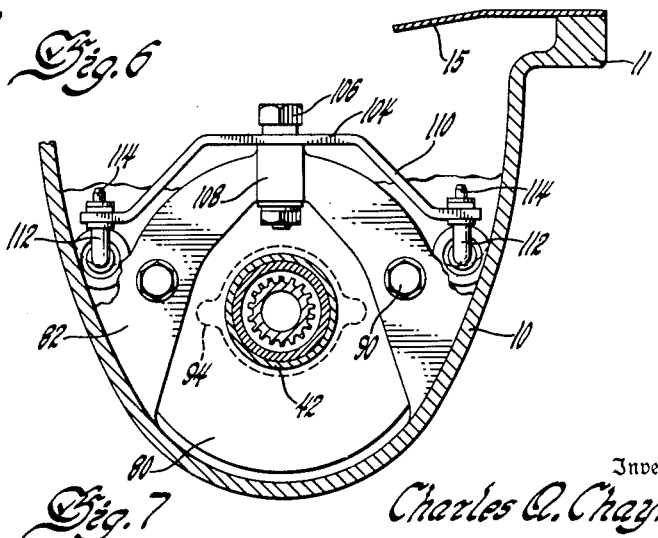
Figure 7 is a section of Figure 6 on the line 7—7.

The applicant's invention is illustrative in an automotive steering column 10 having a generally half elliptical cross section with the long axis of the ellipse in the vertical position.

The section of the steering column 10 as shown in Fig. 1 varies from a small section large enough to house the steering shaft 12 at the left or lower end, and tapers to a section large enough to house the steering shaft and instruments. A flange 11 is formed on each upper edge of the half elliptical steering column 10 so that the column may be supported by and secured to a plate 15 preferably a body reinforcing or supporting plate by suitable means not shown. The steering shaft 12 is supported by a forward bearing 14 mounted in the bearing plate 16 which is secured to or formed integral with the steering column 10. The steering column face plate 18 fits against the upper end of the steering column 10 and has an aperture 20 for the steering shaft. The steering shaft 12 is rotatably supported in the aperture 20 by the bearing 22. The face plate or instrument facing 18 also has an upper aperture 24 to provide a suitable support and housing for an instrument such as the speedometer 26.

The steering connecting shaft 28 terminates in an attaching flange 30 just above the bearing 14. A spline sleeve 32 having an attaching flange 34 engaging the face of the flange 30 carries the splines 36. The spline sleeve 32 may have an inwardly extending lip 38 which fits within a recess 40 in the connecting shaft 28 in order to insure concentric relationship between the connecting shaft and the spline shaft. A guide shaft or sleeve 42 fits closely around the spline sleeve 32 and has an attaching flange 44 engaging the back of the attaching flange 34 of the spline sleeve. The bolts 46 secure the attaching flanges 44, 34 and 30 together to firmly secure the connecting shaft 28 and the spline sleeve 32 and the guide sleeve 42 together as a unit. It will be noted that the guide sleeve portion 42 of the steering shaft 12 extends upwardly through the bearings 22 and into the driving compartment. The axially adjustable steering wheel shaft 48 has a steering wheel 50 attached at the upper end. The shaft 48 extends into the guide sleeve 42 and the spline sleeve 32. The lower end of the shaft 48 has splines 52 which slidably fit within the splines 36 of the spline sleeve 32, to transmit the rotary movement for steering the vehicle. Thus axial sliding adjustment is permitted between the steering wheel shaft 48 and the connecting shaft 28 by means of the splines. In order to limit movement of the shaft 48 and prevent the splines 52 and 36 from being disengaged a groove is cut in the splines 52 and a snap ring 54 positioned therein.

Adjacent the upper end of the steering wheel shaft 48 a plurality of annular locking grooves 56 are formed in the shaft. It will presently be seen that the locking structure would only require a spherical recess or seat for each ball but that an annular recess is used for manufacturing economy. The grooves provide the adjustable positions for the steering wheel position and are shown equally spaced but it is evident that they may be spaced in any desired relationship. A series of round apertures 58 are formed in the guide sleeve or tube 42 and located in a circle around the guide tube. Preferably three equally spaced apertures 58 are employed. Locking balls which may be ball bearings are positioned in the apertures 58 and when in locking position are forced into the grooves 56 to lock the steering wheel shaft 48 in axial position with respect to the guide tube 42. The locking balls 60 are held in position by a locking sleeve 62 which telescopically fits over the guide sleeve 42 and is slidable thereon. The locking sleeve 62 has three detent recesses aligned with the apertures 58 and each consists of a locking part 64 which is sufficiently shallow to force the ball into the grooves 56 on the wheel shaft 48 and a release part 66 which is sufficiently deep to allow the locking balls 60 to move completely out of the grooves 56 in the steering shaft 48.

Referring to the drawing the locking position is illustrated in Figure 2 where the ball 60 is positioned in the aperture 58 in guide tube 42 and engages the groove 56 in the steering wheel shaft 48. The locking ball 60 is illustrated in the released position in Figure 3 where the ball has been moved outwardly and fits in the deep groove 66 in the locking sleeve 62 to permit the balls 60 to slide along the steering wheel shaft 48. The locking sleeve 62 has a recess 68 at its lower end to house a coil spring 70 between the locking sleeve and the guide sleeve. The upper end of the spring 70 engages a shoulder 72 on the locking sleeve 62 and the lower end of the sleeve engages a stop ring 74 suitably secured by means such as welding to the guide sleeve to continually urge the locking sleeve 62 into the locked position. The face plate 18 has an integral tapered cylindrical housing portion 76 extending upwardly and around the locking sleeve 62 to enclose the lower end and the spring. A considerable portion of the locking sleeve 62 extends beyond the housing 76 to provide a handle portion 78 which may be suitably grooved to improve the grip and to operate the locking sleeve. Referring to Figure 1 it will also be noticed that the guide sleeve 42 extends a distance beyond the locking balls 60 equal to the length of the groove portion of the wheel shaft 48 having the grooves 56. Thus the grooves 56 are at all times located within and thus hidden by the guide sleeve 42.

A direction signal switch 80 of conventional structure is located within the steering column 10 and is supported on a bracket 82 having a U-shape by the bolts 90. The ends of the legs of the U-shaped bracket are formed integrally or attached to the steering column 10. The guide sleeve 42 of the steering shaft structure 12 has secured thereto a cam member 94 which is located within the direction signal switch 80 and actuates the self canceling mechanism of the direction signal switch. The direction signal switch is operated by a stud 96 which extends out of the top of the direction signal switch housing 80 and is moved circumferentially of the housing to either side of the central position, as illustrated in dash and dot lines in Figure 5. The operating stud 96 is actuated by the lever 98 having a slot 102 in the end to receive the stud 96. The lever 98 is secured to a transverse lever 104 extending across the steering shaft mechanism. The lever assembly consisting of operating lever 98 and transverse lever 104 has a suitable journal aperture to receive the pivot bolt 106 which is secured in the journal 108 on the bracket. In order to position the switch operating lever mechanism closely adjacent the steering shaft 12 the ends of the transverse lever 104 are provided with downwardly directed offset portions 110. An operating rod 112 is suitably connected to each end of lever 104. The adjacent ends of each of rods 112 and each of the ends of lever 104 are suitably apertured to receive the pivot pins 114. In order to locate the operating buttons 116 substantially in the transverse plane of the steering shaft 12 the operating rods 112 are provided with downwardly offset portions 118. The operating buttons 116 have integrally formed therewith or attached thereto a bearing sleeve portion 120. The end of the bearing sleeve portion 120 has a suitable aperture 122 to receive and be attached to the end of the operating rod 112. The bearing sleeve portion 120 passes through an aperture 124 in the face panel 18. Since the operating rod 112 is pivoted at its inner end to pivoted lever 104 it does not have straight line motion and therefore it is necessary to provide a sliding fulcrum contact where it passes through the face panel 18. This is provided by a split snap ring 126 seated in a groove in the aperture 124. The ring provides a sliding fulcrum for the rod and has sufficient resiliency or spring action to hold the rod 112 in position against vibration.

Although it is believed that the operation of the above described preferred embodiment of the invention will be sufficiently clear from the detail description it is believed advisable to briefly outline the mode of operation. The steering operation of a vehicle employing this axially adjustable steering mechanism is substantially the same as with a conventional steering shaft. The steering effort from the hand wheel 50 is transmitted through the steering wheel shaft 48 and through the splines 52 and 36 to the spline shaft 32. The rotary force is transmitted from the spline shaft 32 through the attaching flange 34 and 30 to the connecting shaft 28. If it is desired to adjust the axial position of the steering wheel with respect to the instrument panel and the other operating controls of the vehicle the driver merely grasps the handle portion 78 of the locking sleeve 62 and forces it downwardly to compress the spring 70 and thereby position the deep recess 66 over the locking balls 60. Then one may adjust the steering wheel 50 axially of the shaft and such axial movement will move the balls outwardly to permit the lands between the grooves 56 of the steering wheel shaft 48 to pass the locking balls 60. Thus it will be seen that the steering wheel may be adjusted in either direction axially of the steering shaft by the vehicle operator while in driving position. The steering wheel shaft 48 may be inserted into the guide sleeve 42 during assembly by retaining the balls 60 in the deep release grooves 66 by a packing of hard grease.

The direction signal switch is operated by a pair of push buttons 116 located on either side of the steering shaft 12. The push buttons 116 are shown in their neutral position in Figure 5 when the switch is not positioned to signal either a right or a left turn. If the button on the right of the driver is moved inwardly to the dotted line position the switch actuating stud 96 will be moved to the right to signal a right turn. When this movement takes place the left-hand operating button 116 is consequently moved outwardly away from the panel 18. When it is desired to signal a left turn the left-hand button is pushed inwardly and the movement if the linkage occurs in a reverse manner to move the switch operating stud 96 to the left to signal a left turn.

A broad detail description of a preferred embodiment of the invention is not to be considered as limiting the invention since it will be apparent to those skilled in the art that many modifications may be made within the scope of the appended claims.

I claim:

1. In a steering column structure, a steering column, a facing secured to one end of said steering column, a steering shaft rotatably mounted and supported within said steering column, a steering wheel shaft, means to connect the steering wheel shaft to the steering shaft to transmit rotary movement and to permit relative axial sliding, locking means movable between an engaged and a disengaged position to lock said steering wheel shaft in a plurality of adjusted positions, and a sleeve on said facing partially covering said locking means in all positions.

2. In a steering column structure, a steering column, a steering shaft rotatably mounted within said steering column, a guide sleeve secured to said steering shaft extending beyond said column, a steering wheel shaft positioned in said guide sleeve, means within said column to connect the steering wheel shaft to the guide sleeve to transmit rotary movement and to permit relative axial sliding, and locking means to lock said steering wheel shaft in a plurality of adjusted positions to the portion of said guide sleeve beyond said column.

3. In a steering column structure, a steering column, a steering shaft rotatably mounted within said steering column, a steering wheel shaft, means to connect the steering wheel shaft to the steering shaft to transmit rotary movement and to permit relative axial sliding, locking means movable between an engaged and a disengaged position to lock said steering wheel shaft in a plurality of adjusted positions, spring means to hold said locking means in locked position and a sleeve on said steering column covering said spring means and partially covering said locking means in all positions.

4. In a steering column structure, a column, a steering shaft rotatably mounted in said column, a guide sleeve attached to one end of said steering shaft, a steering wheel shaft positioned in said guide sleeve, interconnecting means on said sleeve and steering wheel shaft to transmit rotary movement and to permit axial sliding, a plurality of spaced adjusting grooves in said steering wheel shaft, an aperture in said guide sleeve, a locking ball in said aperture, a locking sleeve slidably mounted on said guide sleeve, and having a shallow locking recess to force said locking ball into one of said adjusting grooves and a deep release recess connected thereto to release said locking ball from one of said adjusting grooves, and a spring mounted to retain said locking sleeve in locked position.

5. In a steering column structure, a column, a steering shaft rotatably mounted in said column, a guide sleeve attached to one end of said steering shaft, an internally splined sleeve secured to said steering shaft within said guide sleeve, a splined steering wheel shaft positioned in said guide sleeve, the splines on said splined sleeve and steering wheel shaft being interengaged to transmit rotary movement and to permit axial sliding, a plurality of spaced adjusting grooves in said steering wheel shaft, an aperture in said guide sleeve, a locking ball in said aperture, a locking sleeve slidably mounted on said guide sleeve, and having a shallow locking recess to force said locking ball into one of said adjusting grooves and a deep release recess connected thereto to release said locking ball from one of said adjusting grooves, a spring mounted to retain said locking sleeve in locked position, and said steering column having a housing extending over said spring and a portion of said locking sleeve.

6. In a steering column structure having upper and lower bearing supports, an upper and a lower bearing in said supports, a steering shaft rotatably mounted in one of said bearings, a guide sleeve attached to one end of said steering shaft and mounted in another of said bearings, an internally splined sleeve secured to said steering shaft within said guide sleeve, a splined steering wheel shaft positioned in said guide sleeve, the splines on said splined sleeve and steering wheel shaft being interengaged to transmit rotary movement and to permit axial sliding, a plurality of spaced adjusting grooves in said steering wheel shaft, an aperture in said guide sleeve, a locking ball in said aperture, a locking sleeve slidably mounted on said guide sleeve, and having a shallow locking recess to force said locking ball into one of said adjusting grooves and a deep release recess connected thereto to release said locking ball from one of said adjusting grooves, and a spring mounted to retain said locking sleeve in locked position.

7. In a steering column structure having upper and lower bearing supports, an upper and a lower bearing in said supports, a steering shaft rotatably mounted in one of said bearings, a guide sleeve attached to one end of said steering shaft and mounted in another of said bearings, an internally splined sleeve secured to said steering shaft within said guide sleeve, a splined steering wheel shaft positioned in said guide sleeve, the splines on said splined sleeve and steering wheel shaft being interengaged to transmit rotary movement and to permit axial sliding, a plurality of spaced adjusting grooves in said steering wheel shaft, an aperture in said guide sleeve, a locking ball in said aperture, and a locking sleeve slidably mounted on said guide sleeve and having a shallow locking recess to force said locking ball into one of said adjusting grooves and a deep release recess connected thereto to release said locking ball from one of said adjusting grooves.

8. In a steering column structure having upper and lower bearing supports, an upper and a lower bearing in said supports, a steering shaft rotatably mounted in one of said bearings, a guide sleeve attached to one end of said steering shaft and mounted in another of said bearings, an internally splined sleeve secured to said steering shaft within said guide sleeve, a splined steering wheel shaft positioned in said guide sleeve, the splines on said splined sleeve and steering wheel shaft being interengaged to transmit rotary movement and to permit axial sliding, a plurality of spaced adjusting grooves in said steering wheel shaft, an aperture in said guide sleeve, a locking ball in said aperture, a locking sleeve slidably mounted on said guide sleeve and having a shallow locking recess to force said locking ball into one of said adjusting grooves and a deep release recess connected thereto to release said locking ball from one of said adjusting grooves, a spring mounted on the guide tube to retain said locking sleeve in locked position, and said steering column having a housing extending over a portion of said locking sleeve.

9. In a steering column structure, a column, a steering shaft rotatably mounted in said column, a guide sleeve attached to one end of said steering shaft, a steering wheel shaft positioned in said guide sleeve, interconnecting means on said sleeve and steering wheel shaft to transmit rotary movement and to permit axial sliding, a plurality of spaced adjusting grooves in said steering wheel shaft, an aperture in said guide sleeve, a locking member in said aperture movable between an engaged and a disengaged position, and a locking member axially slidably mounted on said guide sleeve and having means to move said member between an engaged and a disengaged position.

10. In a steering column structure, a column, a steering shaft rotatably mounted in said column, a guide sleeve attached to one end of said steering shaft, a steering wheel shaft positioned in said guide sleeve, interconnecting means on said sleeve and steering wheel shaft to transmit rotary movement and to permit axial sliding, a plurality of spaced adjusting grooves in said steering wheel shaft, an aperture in said guide sleeve, a locking member in said aperture movable between an engaged and a disengaged position, and a locking sleeve slidably mounted on said guide sleeve and having means to move said member between an engaged and a disengaged position.

11. In a steering column structure, a steering column, a steering shaft rotatably mounted within said steering column, a steering wheel shaft, means to connect the steering wheel shaft to the steering shaft to transmit rotary movement and to permit relative axial sliding, and locking means comprising a spherical member movable between engaged and disengaged positions between said shafts to lock said steering wheel shaft in a plurality of adjusted positions and a second member slidable on one of said shafts and having a sloped cam portion engaging said spherical member to move the same between engaged and disengaged positions in response to sliding movement of said second member.

12. In a steering column structure, a steering column, a steering shaft rotatably mounted within said steering column, a guide sleeve coaxially secured to said steering shaft and extending beyond said steering shaft, a steering wheel shaft in said guide sleeve, means located in said guide sleeve to connect said steering wheel shaft and said steering shaft to transmit rotary motion and to permit axial sliding movement, ball means associated with said guide sleeve and said steering wheel shaft to lock said sleeve and said steering wheel shaft in a selected axial relation and a cam member slidably mounted on said sleeve, said cam member being adapted in one direction of its movement to displace said ball means so that the relative axial relation of said steering wheel shaft and said guide sleeve may be changed and being adapted in the other direction of its movement to re-engage said ball means thereby to re-lock said steering wheel shaft and said guide sleeve in their changed relation.

13. In a steering column structure, a steering column, a steering shaft rotatably mounted and supported within said steering column, a steering wheel shaft, means to connect the steering wheel shaft to the steering shaft to transmit rotary movement and to permit relative axial sliding, a spherical member movable between an engaged and a disengaged position to respectively lock and unlock said steering wheel shaft so that the axial relation of the latter may be changed with reference to said column, and means supported by said column and enveloping said spherical member manually movable to effect the engagement and disengagement of said spherical member.

14. In a steering column structure, a steering column member, a steering shaft member rotatably mounted within said steering column member, a steering wheel shaft member, means to connect the steering wheel shaft member to the steering shaft member to transmit rotary movement and to permit relative axial sliding, and ball means movable between an engaged and disengaged position between said shaft members whereby said steering shaft member may be locked in a plurality of adjusted positions and an actuating element for said ball means slidably mounted on one of said members and having a sloped cam portion and another portion, one of said portions engaging said ball means to move the same between said engaged and disengaged positions in response to sliding movement of said actuating element and the other portion engaging said one of said members.

15. In a steering column structure, a steering column member, a steering shaft member rotatably mounted within said steering column member, a steering wheel shaft member, means to connect the steering wheel shaft member to the steering shaft member to transmit rotary movement and to permit relative axial sliding, and ball means movable between an engaged and disengaged position between said shaft members whereby said steering shaft member may be locked in a plurality of adjusted positions and an actuating sleeve slidably mounted on one of said members and having a portion engaging said ball locking means to move the same between said engaged and disengaged positions in response to sliding movement of said sleeve.

References Cited in the file of this patent

UNITED STATES PATENTS

| 447,616 | Libbey | Mar. 3, 1891 |
| 1,621,206 | Kacziba | Mar. 15, 1927 |
| 1,703,485 | Hughes | Feb. 26, 1929 |
| 1,997,780 | Newton | Apr. 16, 1935 |
| 2,074,334 | Hughes | Mar. 23, 1937 |
| 2,075,110 | Garretson | Mar. 30, 1937 |
| 2,218,841 | Bluemel | Oct. 22, 1940 |
| 2,226,656 | Best | Dec. 31, 1940 |
| 2,310,793 | Kryl | Feb. 9, 1943 |

FOREIGN PATENTS

| 208,452 | Great Britain | Dec. 20, 1923 |
| 484,978 | Great Britain | May 12, 1938 |
| 494,902 | Great Britain | Nov. 1, 1938 |